(12) United States Patent
Nishi et al.

(10) Patent No.: US 10,113,554 B2
(45) Date of Patent: Oct. 30, 2018

(54) MANUFACTURING METHOD OF COMPRESSOR IMPELLER AND COMPRESSOR IMPELLER

(75) Inventors: Hayato Nishi, Tokyo (JP); Koki Kambe, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 571 days.

(21) Appl. No.: 14/416,424

(22) PCT Filed: Aug. 1, 2012

(86) PCT No.: PCT/JP2012/069629
§ 371 (c)(1),
(2), (4) Date: Feb. 10, 2015

(87) PCT Pub. No.: WO2014/020732
PCT Pub. Date: Feb. 6, 2014

(65) Prior Publication Data
US 2015/0184672 A1     Jul. 2, 2015

(51) Int. Cl.
*F04D 29/28*     (2006.01)
*B23C 3/18*      (2006.01)
(Continued)

(52) U.S. Cl.
CPC .............. *F04D 29/284* (2013.01); *B23C 3/18* (2013.01); *B23P 15/006* (2013.01); *F04D 17/10* (2013.01); *Y10T 29/49316* (2015.01)

(58) Field of Classification Search
CPC ...... F04D 29/284; F04D 17/10; B23P 15/006; B23C 3/18; Y10T 29/49316
See application file for complete search history.

(56) References Cited

U.S. PATENT DOCUMENTS 2,679,786 A * 6/1954 Breisch ..................... B23C 3/18
                                                  409/121
3,839,942 A    10/1974 Ferchland
(Continued)

FOREIGN PATENT DOCUMENTS

CN    101010157 A    8/2007
DE    2 329 235 A1   12/1974
(Continued)

OTHER PUBLICATIONS

Machine Translation for JP2003340629A.*
(Continued)

*Primary Examiner* — Ian Paquette
(74) *Attorney, Agent, or Firm* — Birch, Stewart, Kolasch & Birch, LLP

(57) ABSTRACT

An object is to provide a manufacturing method of a compressor impeller which produces a small post-cutting residual strain. A compressor impeller is formed by cutting a workpiece. The manufacturing method of a compressor impeller includes: a workpiece-fixing step of fixing a workpiece W on the supporting pedestal 3; and a cutting step of cutting inter-vane regions R and forming a plurality of vane sections B1, B2 and so on with intervals between one another in the circumferential direction of the workpiece W while pressing the workpiece. The cutting step includes selecting one of following steps. In the first cutting step, when successively cutting the plurality of inter-vane regions R1, R2 and so on disposed continuously in the circumferential direction of the workpiece, adjacent one of the inter-vane regions is avoided as often as possible. In the second cutting step, when simultaneously cutting a part of the plurality of inter-vane regions R1, R2 and so on which includes more than one of the inter-vane regions disposed continuously in the circumferential direction of the workpiece, at least one of the part of the plurality of inter-vane (Continued)

regions being cut simultaneously is positioned away from other inter-vane regions being cut simultaneously by a distance of one or more inter-vane regions as often as possible.

5 Claims, 11 Drawing Sheets

(51) Int. Cl.
*B23P 15/00* (2006.01)
*F04D 17/10* (2006.01)

(56) References Cited

U.S. PATENT DOCUMENTS

| | | | | |
|---|---|---|---|---|
| 6,754,954 | B1* | 6/2004 | Decker | B21K 1/36 29/557 |
| 8,678,769 | B2* | 3/2014 | Kubota | B22C 9/22 164/113 |
| 2016/0363134 | A1* | 12/2016 | Seike | F01D 5/027 |

FOREIGN PATENT DOCUMENTS

| | | |
|---|---|---|
| JP | 58-89222 U | 6/1983 |
| JP | S58-89222 U | 6/1983 |
| JP | 63-216644 A | 9/1988 |
| JP | 2001-300812 A | 10/2001 |
| JP | 2002-36020 A | 2/2002 |
| JP | 2003-340629 A | 12/2003 |
| JP | 2004-332733 A | 11/2004 |
| JP | 2011-513077 A | 4/2011 |
| SU | 1053982 A | 11/1983 |

OTHER PUBLICATIONS

JPS63216644A Machine Translation.*
Notice of Allowance effective Oct. 11, 2016 issued to the corresponding CN Application No. 201280074895.2 with English Translation.
European Search Report, dated Mar. 11, 2015, for European Application No. 12882204.6.
International Preliminary Report on Patentability and Written Opinion of the International Searching Authority (Forms PCT/IB/338, PCT/IB/373, PCT/ISA/237, PCT/IB/326) dated Feb. 12, 2015, for International Application No. PCT/JP2012/069629 with an English translation.
International Search Report and Written Opinion of the International Searching Authority (Forms PCT/ISA/210, PCT/ISA/220 and PCT/ISA/237), dated Sep. 11, 2012, for International Application No. PCT/JP2012/069629.
Chinese Office Action effective Nov. 30, 2015, issued in corresponding Chinese Application No. 201280074895.2 with an English Translation.
Decision to Grant a Patent effective Aug. 11, 2016 issued in the corresponding EP Application No. 12882204.6.
Decision to Grant a Patent effective Jan. 13, 2016 issued in the corresponding Japanese Application No. 2014-527902 with an English Translation.

* cited by examiner

Related Art

US 10,113,554 B2

MANUFACTURING METHOD OF COMPRESSOR IMPELLER AND COMPRESSOR IMPELLER

TECHNICAL FIELD

The present disclosure relates to a manufacturing method of a compressor impeller and a compressor impeller manufactured by this manufacturing method. A compressor impeller is formed by cutting a workpiece so as to form a plurality of vane sections with intervals between one another in the circumferential direction of the workpiece.

BACKGROUND

A compressor impeller, represented by a compressor impeller for a turbocharger for instance, is conventionally manufactured by placing a workpiece having a shape of a cone or a truncated cone on a supporting pedestal and then cutting the lateral face of the workpiece with a machine tool or the like while the center portion of the workpiece is being pressed in the axial direction to be fixed on the supporting pedestal by a fixing device provided on the opposite side of the supporting pedestal or by a female screw which corresponds to a male screw provided through the impeller. Patent Document 1, for instance, discloses an invention related to a machine tool for machining a compressor impeller for a turbocharger as a conventional technique related to the prevent disclosure.

CITATION LIST

Patent Literature

Patent Document 1: Japanese Translation of PCT International Application Publication No. 2011-513077

SUMMARY

Technical Problem

When cutting the above described workpiece to manufacture a compressor impeller, the conventional manufacturing method cuts inter-vane regions R1 to R6 successively in the circumferential direction, in order of R1, R2, R3, R4, R5, and R6 as illustrated in FIG. 10A, for instance. Each inter-vane region here is delimited by adjacent two of the vane sections B11 to B16 formed with intervals between one another in the circumferential direction of the workpiece W. Here, circled numbers in FIG. 10A indicate the cutting order of the inter-vane regions.

However, when the inter-vane regions R1 to R6 are cut successively in the circumferential direction while pressing the workpiece W, the center portion 12 may incline toward a side which has been cut previously. That is, when cutting adjacent inter-vane regions successively, the center portion 12 gradually inclines toward a side which has been cut and whose cross section is reduced, thereby accumulating strain at the center portion 12 as the workpiece W is cut in order of R1, R2, R3 and so on, as illustrated in FIG. 10B. This strain slightly decreases in the process of cutting R4 to R6 disposed on the opposite side of R1 to R3 in the circumferential direction, but a residual strain δr is eventually produced.

Although the residual strain δr at the center portion 12 is so slight that it is invisible to human eyes, uneven distribution of the weight with respect to the axial center may cause noise or vibration upon driving, which may negatively affect the product value and product lifetime of a turbocharger.

The present invention was made in view of the above described problems of the conventional technique to provide a manufacturing method of a compressor impeller formed by cutting a workpiece which produces a small post-cutting residual strain.

Solution to Problem

To achieve the above object, at least one embodiment of the present invention provides a manufacturing method of a compressor impeller formed of a workpiece which is cut so that a plurality of vane sections are formed with intervals between one another in a circumferential direction of the workpiece. The manufacturing method includes: a workpiece-fixing step of placing the workpiece on a supporting pedestal and fixing the workpiece on the supporting pedestal by pressing the placed workpiece; and a cutting step of cutting an inter-vane region delimited by adjacent two of the vane sections and forming the plurality of vane sections with intervals between one another in the circumferential direction of the workpiece while pressing the workpiece. In the cutting step, one of the first cutting step and the second cutting step is selected. In the first cutting step, when successively cutting the plurality of inter-vane regions disposed continuously in the circumferential direction of the workpiece, the plurality of inter-vane regions are cut while avoiding adjacent one of the inter-vane regions as often as possible. In the second cutting step, when simultaneously cutting a part of the plurality of inter-vane regions which includes more than one of the inter-vane regions disposed continuously in the circumferential direction of the workpiece, the part of the plurality of inter-vane regions is cut so that at least one of the part of the plurality of inter-vane regions being cut simultaneously is positioned away from a remainder of the part of the plurality of inter-vane regions being cut simultaneously by a distance of one or more inter-vane regions as often as possible.

In the above manufacturing method of a compressor impeller, one of the first cutting step and the second cutting step is selected. In the first cutting step, when successively cutting the plurality of inter-vane regions disposed continuously in the circumferential direction of the workpiece, adjacent one of the inter-vane regions is avoided as often as possible. In the second cutting step, when simultaneously cutting a part of the plurality of inter-vane regions which includes more than one of the inter-vane regions disposed continuously in the circumferential direction of the workpiece, at least one of the part of the plurality of inter-vane regions being cut simultaneously is positioned away from a remainder of the part of the plurality of inter-vane regions being cut simultaneously by a distance of one or more inter-vane regions as often as possible.

As described above, adjacent inter-vane regions are basically not cut successively or simultaneously. Thus, it is possible to restrict the post-cutting residual strain.

In the present invention, the plurality of vane sections and the plurality of inter-vane regions include at least four vane sections and four inter-vane regions continuously disposed in the circumferential direction of the workpiece, respectively.

Further, in the manufacturing method of a compressor impeller according to one embodiment of the present invention, when the first cutting step is selected in the cutting step, one of two of the inter-vane regions being cut successively is positioned away from another one of the two by a distance of one inter-vane region as often as possible.

According to the above manufacturing method of a compressor impeller, the workpiece is successively cut at positions away by a distance of one inter-vane region as often as possible. Thus, it is possible to restrict the post-cutting residual strain without reducing the manufacturing speed.

Here, in the present specification, "as often as possible" means "unless there is no other choice and it is impossible to do so". Specifically, in an exemplary case illustrated in FIGS. 11A and 11B where an even number of (six, for instance) inter-vane regions R1 to R6 disposed continuously in the circumferential direction are cut successively while moving by a distance of one inter-vane region, at the point when a half of the whole inter vane regions (R1, R3, R5) has been cut, the inter-vane region R1 which has been cut first is positioned away from the inter-vane region R5 which has been cut last by a distance of one inter-vane region, as illustrated in FIG. 11A. In this case, it is impossible to cut the workpiece at a position away by a distance of one inter-vane region. Thus, after cutting the inter-vane region R5, the inter-vane region R2 disposed at a position away from the inter-vane region R5 by a distance of two inter-vane regions, for instance, is cut exceptionally as illustrated in FIG. 11B. After cutting the inter-vane region R2, the inter-vane regions R4, R6 are cut successively while moving by a distance of one inter-vane region again.

Further, in the manufacturing method of a compressor impeller according to one embodiment of the present invention, when the first cutting step is selected in the cutting step and the plurality of inter-vane regions disposed continuously in the circumferential direction of the workpiece are cut successively, one of the inter-vane regions being cut successively is positioned diagonally in the circumferential direction of the workpiece with respect to another one.

According to the above manufacturing method of a compressor impeller, one of the inter-vane regions being cut successively is positioned diagonally with respect to another one in the circumferential direction of the workpiece. Thus, it is possible to restrict the post-cutting residual strain.

Further, in the manufacturing method of a compressor impeller according to one embodiment of the present invention, when the second cutting step is selected in the cutting step and the plurality of inter-vane regions disposed continuously in the circumferential direction of the workpiece are cut in pairs simultaneously, two of the inter-vane regions being cut simultaneously are positioned diagonally with respect to each other.

According to the above manufacturing method of a compressor impeller, two inter-vane regions being cut simultaneously are positioned diagonally with respect to each other. Thus, it is possible to restrict the post-cutting residual strain.

Here, with regard to the invention according to claims 3 and 4, when an even number (six, for instance) of the inter-vane regions are provided, it is possible to unambiguously determine two inter-vane regions positioned diagonal to each other in the circumferential direction of the workpiece, such as R1 to R4, R2 to R5, and R3 to R6, as illustrated in FIG. 12A. However, when an odd number (seven, for instance) of the inter-vane regions are provided, R4 and R5 are disposed on a position diagonal to R1, R5 and R6 are disposed on a position diagonal to R2, and so on. Thus, it is not necessarily always possible to unambiguously determine two inter-vane regions diagonal to each other in the circumferential direction of the workpiece. In such a case where an odd number of the inter-vane regions are provided, any one of the two inter-vane regions (R4 and R5 diagonal to R1, for instance) positioned diagonal to one of the inter-vane regions may be selected as the inter-vane region which is "positioned diagonally in the circumferential direction of the workpiece".

Further, in the manufacturing method of a compressor impeller according to one embodiment of the present invention, when the second cutting step is selected in the cutting step and the inter-vane regions disposed continuously in the circumferential direction of the workpiece are divided into two groups and all of the inter-vane regions in each group are cut simultaneously, the inter-vane regions in said each group are positioned away from one another by a distance of one inter-vane region in the circumferential direction of the workpiece as often as possible.

According to the above manufacturing method of a compressor impeller, the inter-vane regions are divided into two groups each of which is cut simultaneously so that the inter-vane regions in said each group are positioned away from one another by a distance of one inter-vane region in the circumferential direction of the workpiece as often as possible. Thus, it is possible to restrict the post-cutting residual strain.

In the above embodiment, the plurality of vane sections includes two kinds of vanes: long vanes and short vanes. The short vanes have vane length shorter than that of the long vanes. When the long vanes and the short vanes are formed alternately with intervals in the circumferential direction of the workpiece, each region delimited by adjacent two of the long vanes may be regarded as one of the inter-vane regions.

Further, in the above embodiment, the plurality of vane sections includes two kinds of vanes: long vanes and short vanes. The short vanes have vane length shorter than that of the long vanes. When the long vanes and the short vanes are formed alternately with intervals in the circumferential direction of the workpiece, each region delimited by one of the long vanes and one of the short vanes adjacent to each other may be regarded as one of the inter-vane regions.

Further, a compressor impeller according to one embodiment of the present invention is manufactured by the manufacturing method described in any one of the above.

A compressor impeller manufactured by the manufacturing method described in any one of the above produces a small post-cutting residual strain. Thus, the weight balance with respect to the axial center is not lost, and noise generation or the like upon driving is prevented.

Advantageous Effects

According to the present invention, it is possible to provide a manufacturing method of a compressor impeller which is formed by cutting a workpiece and which has a small post-cutting residual strain.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
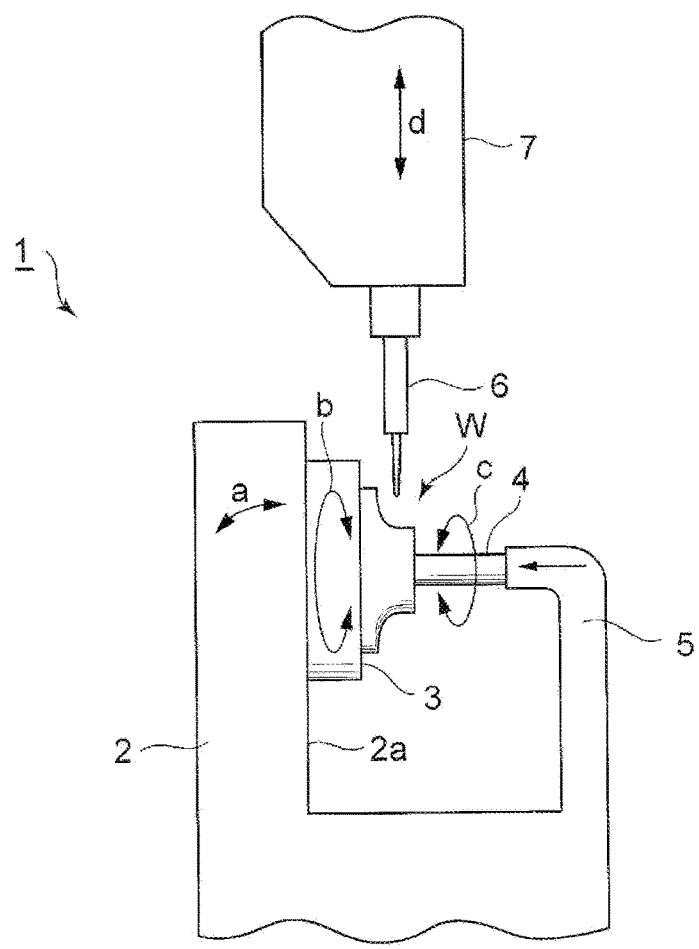
FIG. 1 is a schematic diagram of a cutting machine used in a manufacturing method of a compressor impeller according to one embodiment of the present invention.
Figure 2:
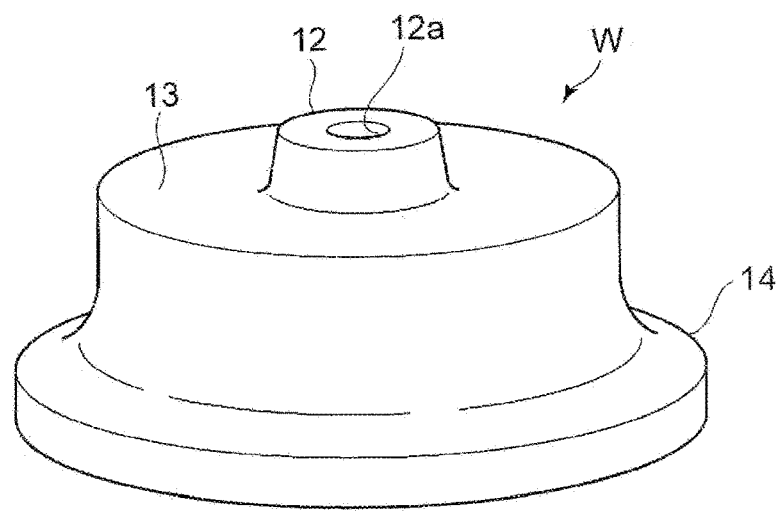
FIG. 2 is a perspective view of a workpiece.
Figure 3:
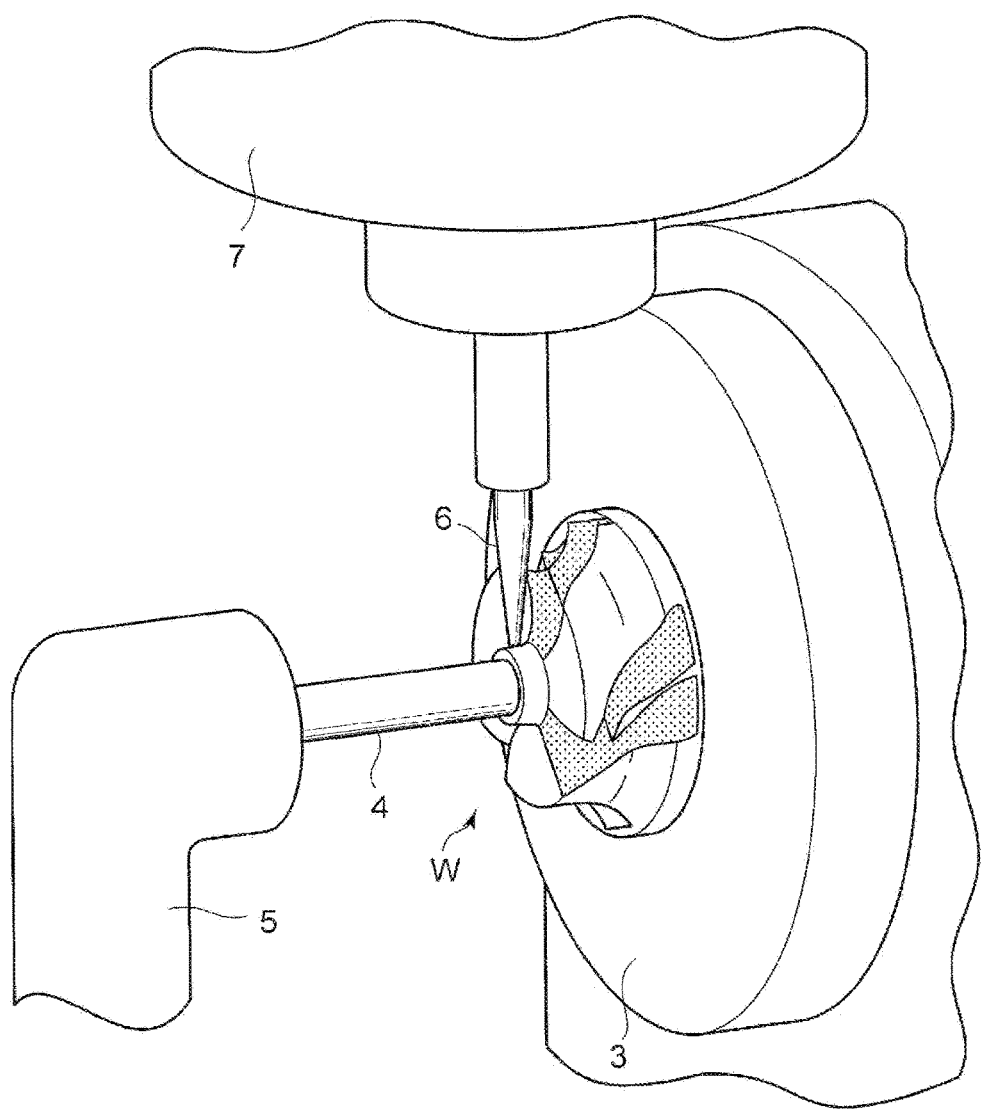
FIG. 3 is a diagram of a state where a workpiece is being cut.
Figure 4:
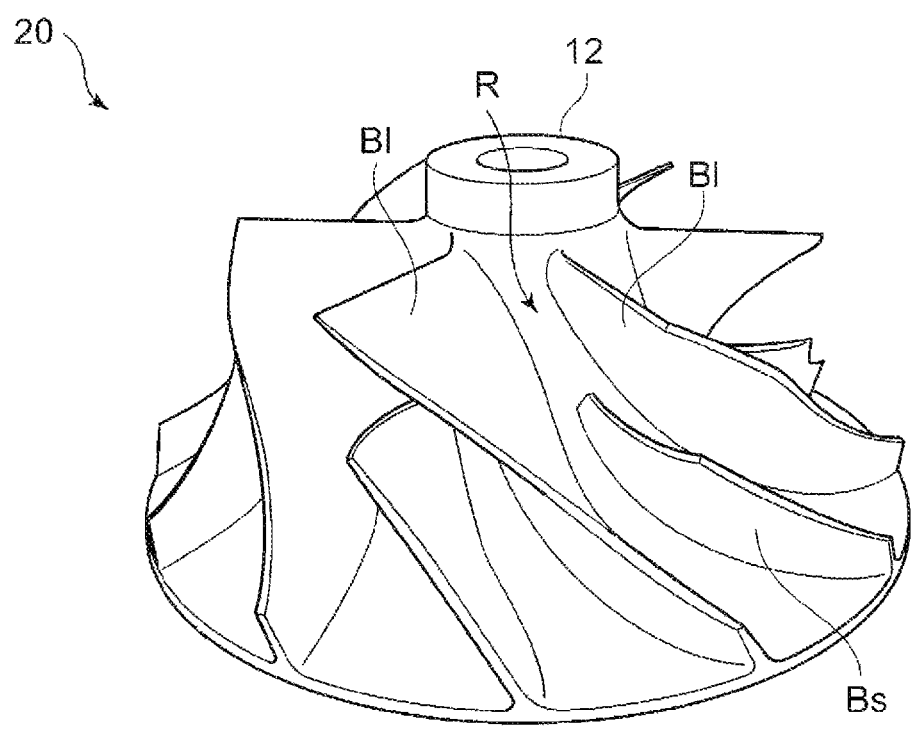
FIG. 4 is a perspective view of a compressor impeller according to one embodiment of the present invention.

FIG. 1 is a schematic diagram of a cutting machine used in a manufacturing method of a compressor impeller according to one embodiment of the present invention. FIG. 2 is a perspective view of a workpiece. FIG. 3 is a diagram of a state where a workpiece is being cut. FIG. 4 is a perspective view of a compressor impeller according to one embodiment of the present invention. As illustrated in FIG. 1, a cutting machine 1 includes a main body 2, a supporting pedestal 3, a fixing protrusion 4, a holding arm 5, a cutting tool 6, and a machining main shaft part 7.

The main body 2 is configured to be capable of inclining in the direction indicated by arrow "a" in FIG. 1. The supporting pedestal 3 is disposed on the supporting face 2a of the main body 2. The supporting pedestal 3 is capable of rotating in the direction of arrow "b" in FIG. 1. A workpiece W which is to be machined is placed on the supporting pedestal 3. The workpiece W placed on the supporting pedestal 3 is pressed in the axial direction by the fixing protrusion 4 to be fixed on the supporting pedestal 3. Here, the technique of fixing the workpiece W on the supporting pedestal 3 is not limited to this. For instance, the workpiece W may be pressed in the axial direction to be fixed on the supporting pedestal 3 by a female screw which corresponds to a male screw provided through the workpiece W.

The fixing protrusion 4 is supported by the holding arm 5 to be freely rotatable in the direction of arrow "c" in FIG. 1. The holding arm 5 is joined to the main body 2 integrally and configured to be capable of pressing the fixing protrusion 4 against the supporting pedestal 3. Also, the machining main shaft part 7 includes a cutting tool 6 attached to its lower end, and is configured to be capable of being lifted and lowered in the vertical direction of arrow "d" in FIG. 1.

As illustrated in FIG. 2, the workpiece W has a shape of a truncated cone, which is a cone-like shape whose apex is severed. A center portion 12 is formed into a projecting shape at the center of the top face 13 of the workpiece W. Also, a center hole 12a is formed at the center of the center portion 12. The above descried fixing protrusion 4 engages with the center hole 12a to determine a position of the workpiece W and fix the workpiece W. The workpiece W is, although not particularly limited, made of a material such as aluminum.

The above described workpiece W is cut by the cutting machine 1 to produce a compressor impeller 20 according to one embodiment of the present invention. As illustrated in FIG. 4, the compressor impeller 20 includes a plurality of long vane sections Bl and short vane sections Bs alternately formed with intervals between one another in the circumferential direction of the workpiece W. The long vane sections Bl are formed over the entire height of the lateral face 14 of the workpiece W, while the short vane sections Bs are formed to be shorter than the long vane sections Bl on the lateral face 14 of the workpiece W.

Using the above described cutting machine 1, the compressor impeller 20 according to one embodiment of the present invention is manufactured as follows. Firstly, the workpiece W is placed on the supporting pedestal 3 of the cutting machine 1. Then, the placed workpiece W is pressed by the fixing protrusion 4 against the supporting pedestal 3 to be fixed on the supporting pedestal 3 (workpiece fixing step).

Next, as illustrated in FIG. 3, while the workpiece W is pressed against the supporting pedestal 3 to be fixed thereon, the machining main shaft part 7 is lowered to press the cutting tool 6 against the workpiece W, thereby cutting the top face 13 and the lateral face 14 of the workpiece W. At this point, the main body 2 is repeatedly inclined in the direction of arrow "a", which makes it possible to press the cutting tool 6 against the lateral face 14 of a curved shape along the curve thereof to cut the lateral face 14. Next, as illustrated in FIG. 4, after cutting one inter-vane region R delimited by two adjacent long vane sections Bl, for instance, the workpiece W is rotated in the circumferential direction by rotating the supporting pedestal 3, and other inter-vane regions R are cut similarly, so that a plurality of vane sections Bl, Bs are formed with intervals between one another in the circumferential direction of the workpiece W (cutting step).

The manufacturing method of a compressor impeller according to one embodiment of the present invention is particularly characterized by the technical feature in the order of cutting the workpiece W in the circumferential direction. Specifically, the manufacturing method is characterized by the technical feature of selecting one of the following two cutting steps in the above cutting step. When successively cutting the plurality of inter-vane regions R disposed continuously in the circumferential direction of the workpiece W, an adjacent inter-vane region is avoided as often as possible (the first cutting step). When simultaneously cutting a part of inter-vane regions from among the plurality of inter-vane regions R disposed continuously in the circumferential direction of the workpiece W, the part including more than one of the inter-vane regions, the part is cut so that at least one of the part of the inter-vane regions R being simultaneously cut is positioned away from the remainder of the part of the inter-vane regions R being cut at the same time by a distance of one or more inter-vane regions as often as possible (the second cutting step). Now, the order of cutting the workpiece W in the circumferential direction, in the manufacturing method of a compressor impeller according to one embodiment of the present invention, will be described in detail.

Figure 5A:
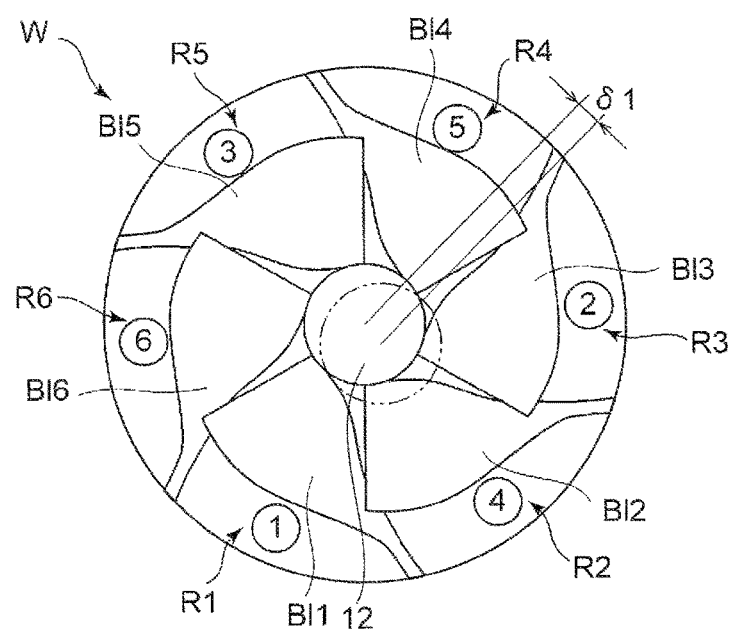
FIGS. 5A and 5B are diagrams illustrating a relationship between the cutting order of a workpiece and the strain at the center portion according to one embodiment of the present invention.
Figure 5B:
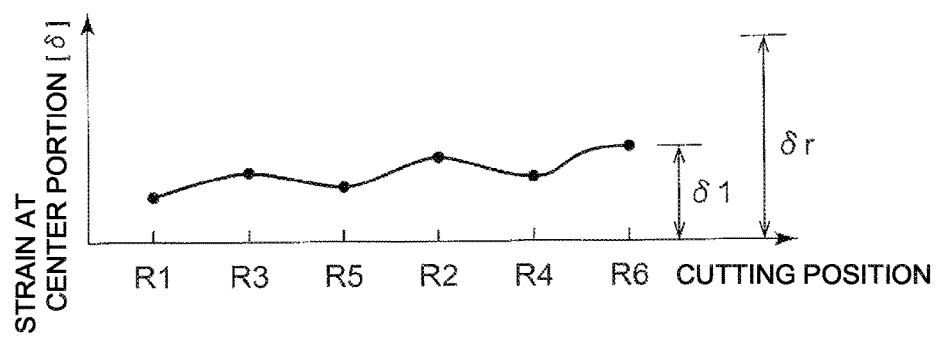

FIGS. 5A and 5B are diagrams illustrating a relationship between the cutting order of the workpiece W and the strain ($\delta$) at the center portion 12 according to one embodiment of the present invention. In this embodiment, the first cutting step is selected in the above described cutting step, so that one of two inter-vane regions to be cut successively is positioned away from the other one by a distance of one inter-vane region in the circumferential direction of the workpiece W as often as possible when successively cutting the plurality of (for example, six) inter-vane regions R1, R2, R3, R4, R5, R6 disposed continuously in the circumferential direction of the workpiece W.

Specifically, as illustrated in FIG. 5A, R1 is cut first, then R3 positioned away from R1 by a distance of one inter-vane region is cut, and next, R5 positioned away from R3 by a distance of one inter-vane region is cut. Since R1 and R3 each of which is positioned away from R5 by a distance of one inter-vane region have been cut already, R2 positioned away by a distance of two inter-vane regions is cut after cutting R5, for instance. Then, R4 positioned away from R2 by a distance of one inter-vane region is cut, and finally, R6 positioned away from R4 by a distance of one inter-vane region is cut. Here, circled numbers in FIG. 5A indicate the cutting order of the inter-vane regions.

As described above, the workpiece W is successively cut at positions away by a distance of one inter-vane region as often as possible, so that adjacent inter-vane regions are basically not cut in succession, which makes it possible to restrict the accumulation of strain at the center portion 12 to be small as illustrated in FIG. 5B. As a result, it is possible to restrict the post-cutting residual strain $\delta 1$ to be small as compared to the residual strain $\delta r$ of a conventional case where adjacent inter-vane regions are cut successively.

Further, the distance of rotation upon rotating the workpiece W in the circumferential direction after cutting one inter-vane region is short as compared to the following embodiment. Thus, it is possible to restrict the post-cutting residual strain $\delta 1$ to be small without decreasing the manufacturing speed.

Although FIGS. 5A and 5B illustrate a case where an even number (six) of the inter-vane regions R1 to R6 are disposed continuously in the circumferential direction as an example, the present embodiment is not limited to this and may be applied to a case where an odd number (for example, five) of the inter-vane regions are disposed continuously in the circumferential direction. When an odd number of the inter-vane regions are provided, it is possible to successively cut all of the inter-vane regions at a position away by a distance of one inter-vane region.

Figure 6A:
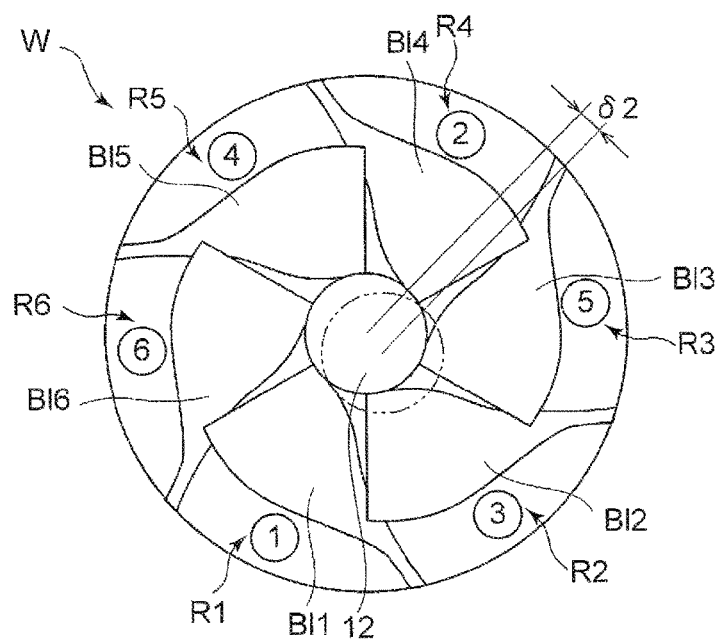
FIGS. 6A and 6B are diagrams illustrating a relationship between the cutting order of a workpiece and the strain at the center portion according to one embodiment of the present invention.
Figure 6B:
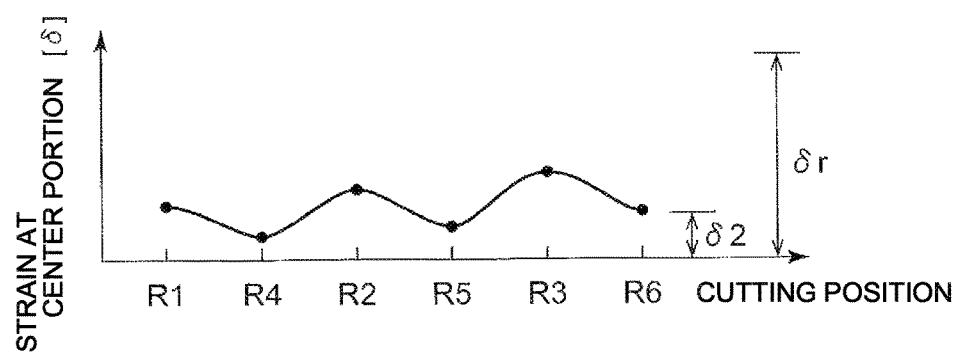

FIGS. 6A and 6B are diagrams illustrating a relationship between the cutting order of the workpiece W and the strain ($\delta$) at the center portion 12 according to one embodiment of the present invention. In this embodiment, the first cutting step is selected in the above described cutting step. Thus, one of two inter-vane regions to be cut successively is positioned diagonally with respect to the other one in the circumferential direction of the workpiece W, when successively cutting, two by two, an even number of (for example, six) inter-vane regions R1, R2, R3, R4, R5, R6 disposed continuously in the circumferential direction of the workpiece W.

Specifically, as illustrated in FIG. 6A, R1 is cut first, and then R4 positioned diagonally with respect to R1 in the circumferential direction is cut. Next, R2 adjacent to the previously cut R1 is cut, and then R5 positioned diagonally with respect to R2 in the circumferential direction is cut. Finally, R3 adjacent to the previously cut R2 is cut, and then the remaining R6 positioned diagonally with respect to R3 in the circumferential direction is cut.

As described above, the workpiece W is cut so that one of two inter-vane regions to be cut successively is positioned diagonally with respect to the other one of the two in the circumferential direction of the workpiece W, so that part of strain that has been previously generated is cancelled when cutting an inter-vane region at the diagonal position, which makes it possible to restrict the accumulation of strain at the center portion 12 to be small as illustrated in FIG. 6B. As a result, it is possible to restrict the post-cutting residual strain $\delta 2$ to be small as compared to the residual strain $\delta r$ of a conventional case where adjacent inter-vane regions are cut successively.

Figure 7A:
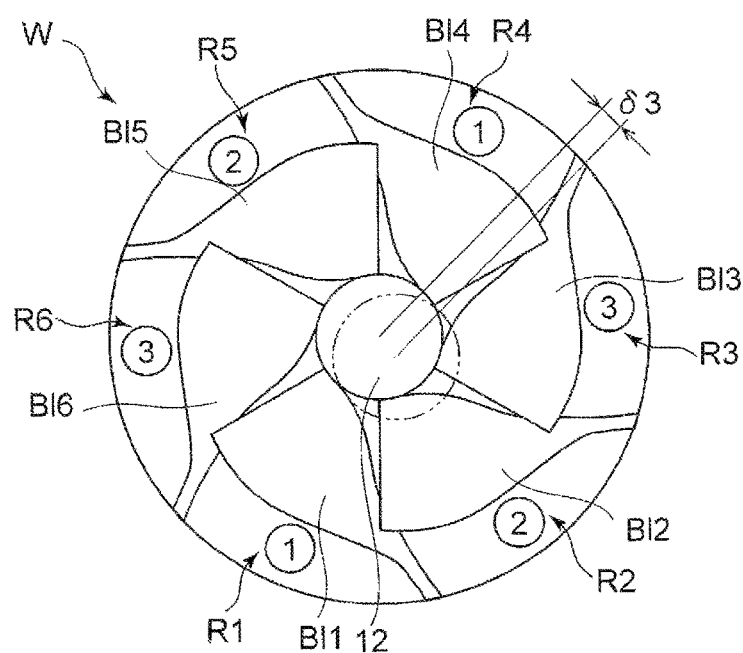
FIGS. 7A and 7B are diagrams illustrating a relationship between the cutting order of a workpiece and the strain at the center portion according to one embodiment of the present invention.
Figure 7B:
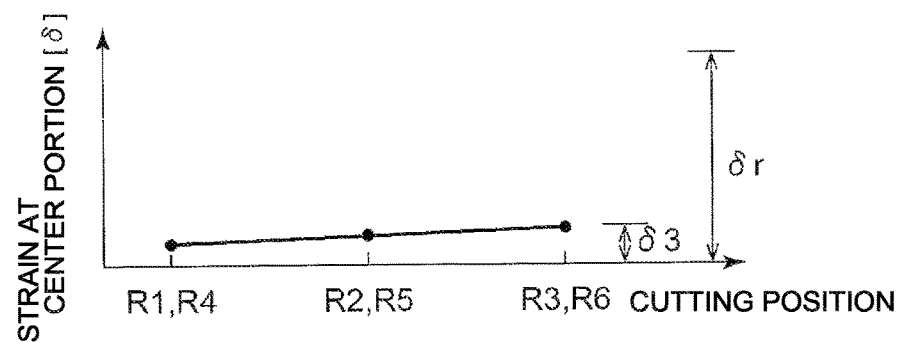

FIGS. 7A and 7B are diagrams illustrating a relationship between the cutting order of the workpiece and the strain at the center portion according to one embodiment of the present invention. In this embodiment, the second cutting step is selected in the above described cutting step. Thus, two inter-vane regions to be cut simultaneously are positioned diagonally with each other, when cutting an even number of (for example, six) inter-vane regions R1, R2, R3, R4, R5, R6 disposed continuously in the circumferential direction of the workpiece W in pairs, each pair being cut spontaneously.

Specifically, as illustrated in FIG. 7A, R1 and R4 positioned diagonally with respect to R1 in the circumferential direction are cut first simultaneously. Then, R2 and R5 positioned diagonally with respect to R2 in the circumferential direction are cut simultaneously. Finally, R3 and R6 positioned diagonally with respect to R3 in the circumferential direction are cut simultaneously.

As described above, two inter-vane regions positioned diagonally with respect to each other are cut simultaneously, so that the workpiece W is always cut while having a symmetry shape with respect to the center portion 12, which makes it possible to restrict the accumulation of strain at the center portion 12 as illustrated in FIG. 7B. As a result, it is possible to restrict the post-cutting residual strain $\delta 3$ to be small as compared to the residual strain $\delta r$ of a conventional case where adjacent inter-vane regions are cut successively.

Figure 8A:
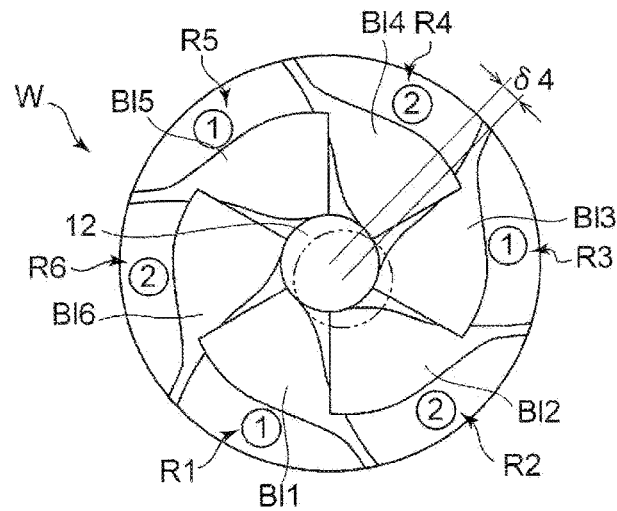
FIGS. 8A to 8C are diagrams illustrating a relationship between the cutting order of a workpiece and the strain at the center portion according to one embodiment of the present invention.
Figure 8B:
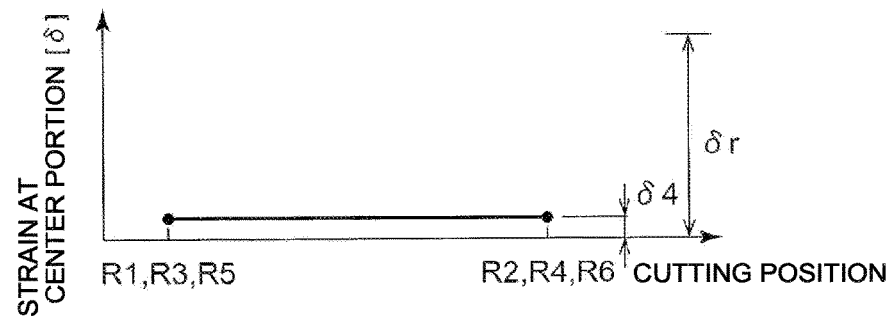

FIGS. 8A and 8B are diagrams illustrating a relationship between the cutting order of the workpiece and the strain at the center portion according to one embodiment of the present invention. In this embodiment, the second cutting step is selected in the above described cutting step. Thus, when dividing the plurality of (for example, six) inter-vane regions R1, R2, R3, R4, R5, R6 disposed continuously in the circumferential direction of the workpiece W into two groups (for instance, a group of R1, R3, R5 and a group of R2, R4, R6) and cutting all of the inter-vane regions in the same group at the same time, the inter-vane regions are divided into the two groups so that the inter-vane regions in each group are positioned away from one another by a distance of one inter-vane region in the circumferential direction of the workpiece W as often as possible.

That is, as illustrated in FIG. 8A, the six inter-vane regions R1 to R6 are divided into two groups, one including R1, R3, R5 and the other including R2, R4, R6, so that all inter-vane regions in each group are positioned away from one another by a distance of one inter-vane region. In the beginning, R1, R3, R5 of the first group are cut simultaneously, and then R2, R4, R6 of the second group are cut simultaneously.

As described above, the plurality of inter-vane regions are divided into two groups each of which is to be cut simultaneously so that the inter-vane regions in the same group are positioned away from one another by a distance of one inter-vane region in the circumferential direction of the workpiece W as often as possible. In this way, two adjacent inter-vane regions are basically not cut at the same time, which makes it possible to restrict the accumulation of strain at the center portion 12 to be small as illustrated in FIG. 8B. As a result, it is possible to restrict the post-cutting residual strain δ4 to be small as compared to the residual strain δr of a conventional case where adjacent inter-vane regions are cut successively.

Figure 8C:
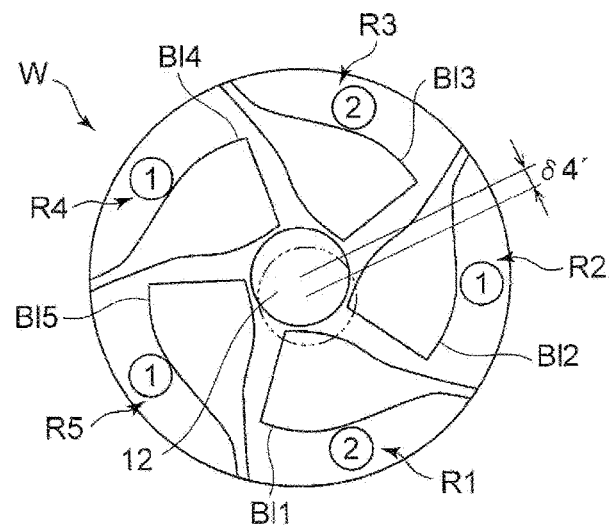

Although FIGS. 8A and 8B illustrate a case where an even number (six) of the inter-vane regions R1 to R6 are disposed continuously in the circumferential direction as an example, the present embodiment is not limited to this. As illustrated in FIG. 8C, the present embodiment may be applied to a case where an odd number (for example, five) of the inter-vane regions R1, R2, R3, R4, R5 are disposed continuously in the circumferential direction.

When an odd number of the inter-vane regions are provided, it may be impossible to divide the inter-vane regions into two groups so that all of the inter-vane regions in each of the divided two groups (for instance, one group including R1, R3 and the other including R2, R4, R6) are positioned away from one another by a distance of one inter-vane region, and there is always a pair of inter-vane regions adjacent to each other (for instance, R4 and R5) belonging to the same group. As illustrated in FIG. 8C, however, as long as the inter-vane regions are divided into two groups each of which is to be cut simultaneously so that the inter-vane regions are positioned away from one another by a distance of one inter-vane region in the circumferential direction of the workpiece W as often as possible, R1 is positioned away from R3 by a distance of one inter-vane region, and R2 is positioned away from R4 and R5 by a distance of one inter-vane region, where R1 and R3 are to be cut simultaneously, and R2, R4, and R5 are to be cut simultaneously. Thus, it is possible to restrict the post-cutting residual strain δ4' to be small similarly to the case of an even number.

Embodiments of the present invention were described in detail above, but the present invention is not limited thereto, and various amendments and modifications may be implemented within a scope that does not depart from the present invention.

Figure 9:
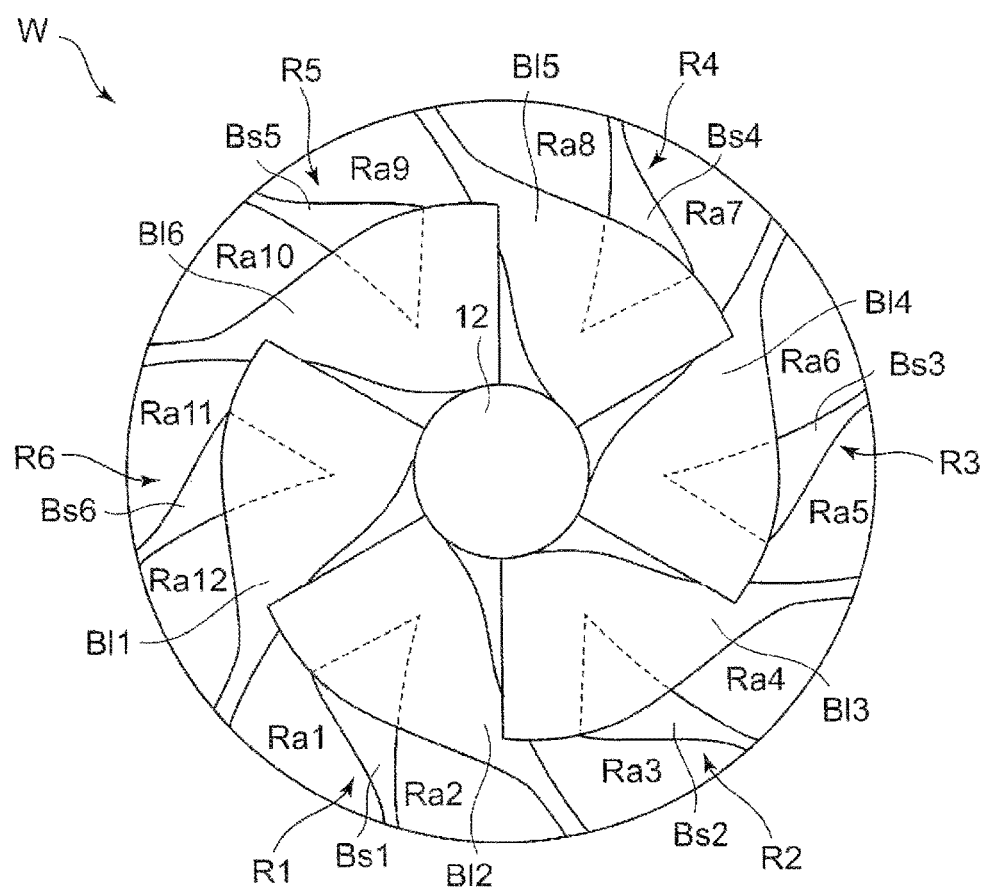
FIG. 9 is a diagram for describing the definition of inter-vane regions according to one embodiment of the present invention.
Figure 10A:
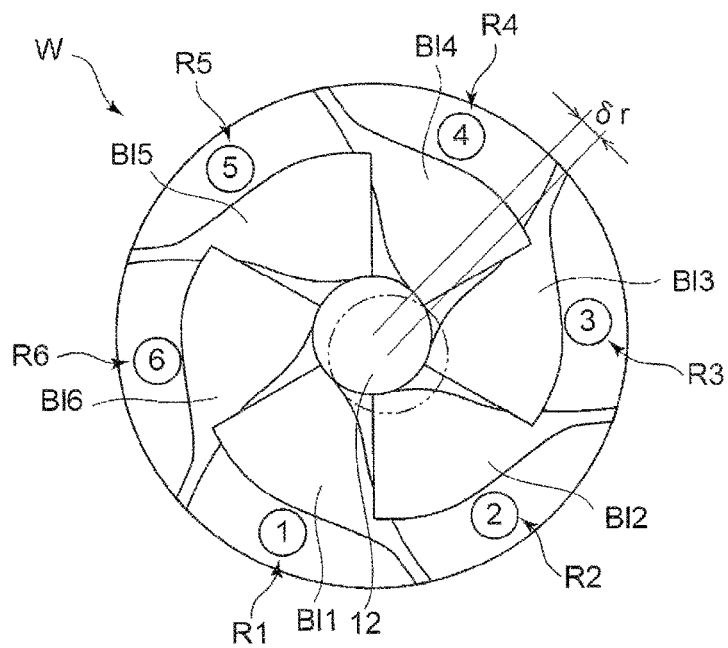
FIGS. 10A and 10B are diagrams of a relationship between a conventional cutting order for a workpiece and the strain at the center portion.
Figure 10B:
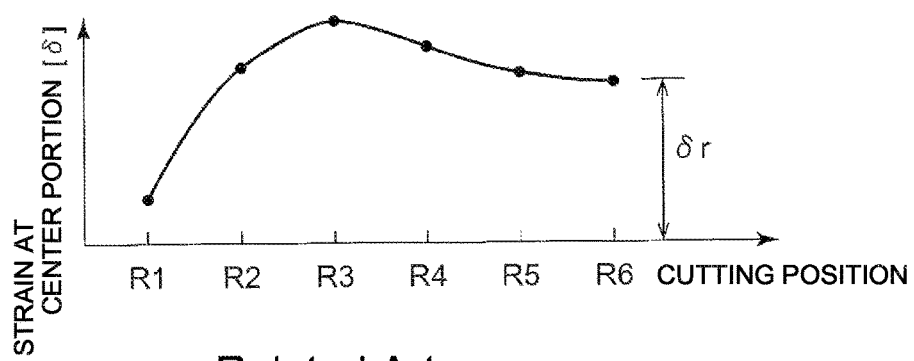
Figure 11A:
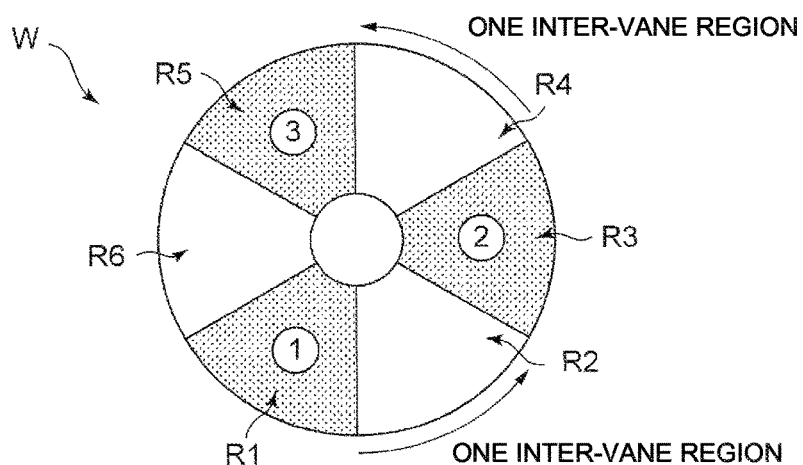
FIG. 11 is a diagram for describing a cutting order for a workpiece according to one embodiment of the present invention.
Figure 11B:
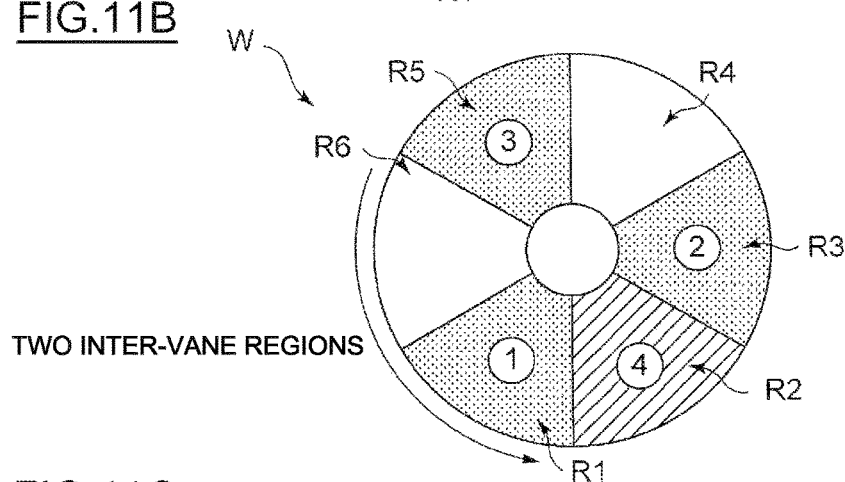
Figure 11C:
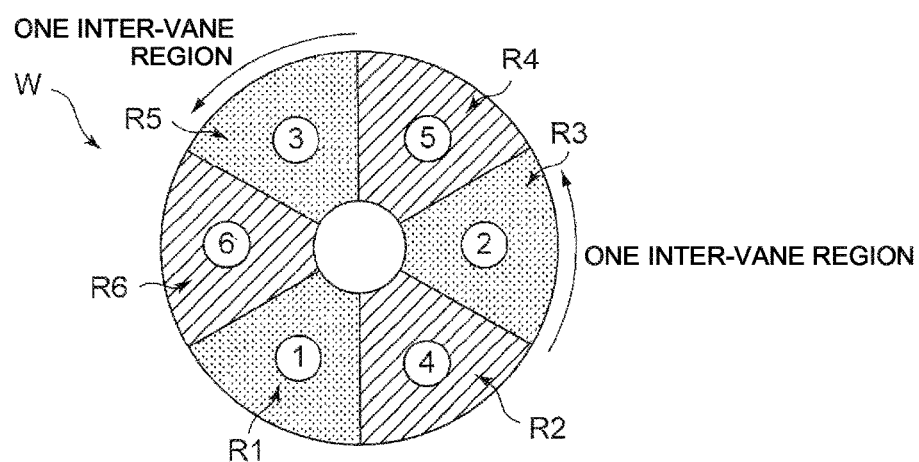
Figure 12A:
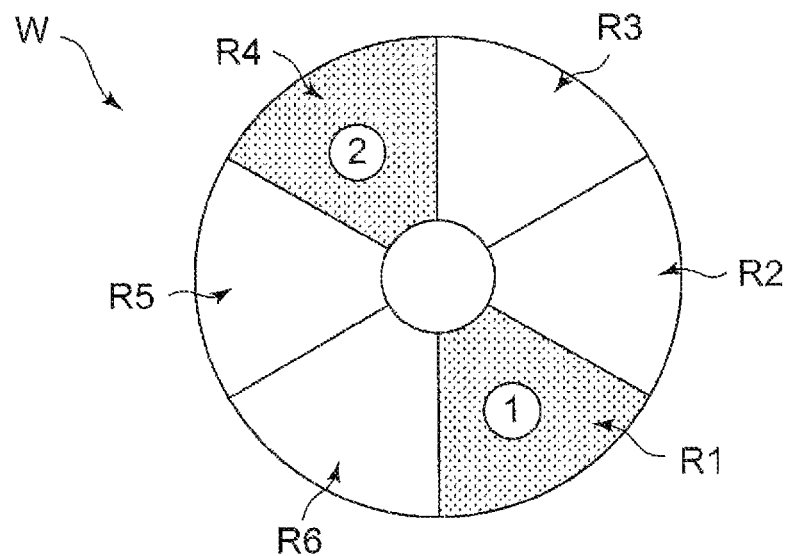
FIG. 12 is a diagram for describing a cutting order for a workpiece according to one embodiment of the present invention.
Figure 12B:
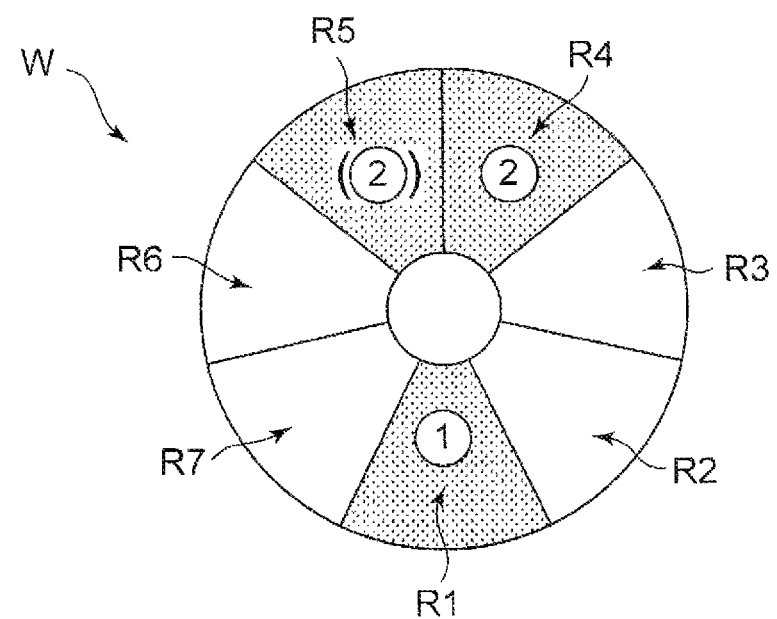

For example, in the above described embodiments, a region delimited by adjacent two long vane sections B1 is regarded as an inter-vane region R from among two kinds of vane sections of the long vane sections B1 and the short vane sections Bs formed alternately with intervals between one another in the circumferential direction of the workpiece W, and each inter-vane section R is described as one unit region for cutting. However, the present invention is not limited to this. As illustrated in FIG. 9, for instance, a region delimited by a long vane section B1 and a short vane section Bs adjacent to each other may be regarded as an inter-vane region Ra, and each of the inter-vane regions Ra1 to Ra12 may be regarded as one unit for cutting when implementing the present embodiment.

According to at least one embodiment of the present invention, in the above described cutting step, when cutting the plurality of inter-vane regions R disposed continuously in the circumferential direction of the workpiece W successively or cutting more than one inter-vane regions R thereof simultaneously, the workpiece W is cut so that one of two inter-vane regions R to be cut successively or at least one of the more than one inter-vane regions to be cut simultaneously is positioned away from a distance of one or more inter-vane regions in the circumferential direction of the workpiece W as often as possible with respect to the other one of the two inter-vane regions R to be cut successively or the remainder of the inter-vane regions R to be cut simultaneously.

Accordingly, adjacent inter-vane regions R are basically not cut successively or spontaneously. Thus, it is possible to restrict the post-cutting residual strain.

INDUSTRIAL APPLICABILITY

One embodiment of the present invention may be suitably used as a manufacturing method of a compressor impeller represented by a compressor impeller for a turbocharger, for instance.

REFERENCE SIGNS LIST

1 Cutting machine
2 Main body
2a Supporting face
3 Supporting pedestal
4 Inter-vane region
5 Holding arm
6 Cutting tool
7 Machining main shaft part
12 Center portion
12a Center hole
13 Top surface
14 Lateral face
20 Compressor impeller
B Vane section
B1 Long vane section
Bs Short vane section
R Inter-vane region
W Workpiece

The invention claimed is:

1. A manufacturing method of a compressor impeller formed of a single workpiece which is cut so that a plurality of vane sections are formed with intervals between one another in a circumferential direction of the workpiece, the manufacturing method comprising:
   a workpiece-fixing step of placing the workpiece on a supporting pedestal and fixing the workpiece on the supporting pedestal by pressing the placed workpiece; and
   a cutting step of cutting an inter-vane region delimited by adjacent two of the vane sections and forming the plurality of vane sections with intervals between one another in the circumferential direction of the workpiece while pressing the workpiece,
   wherein the cutting step includes
   a second cutting step of cutting, when simultaneously cutting a part of the plurality of inter-vane regions which includes more than one of the inter-vane regions disposed continuously in the circumferential direction of the workpiece, the part of the plurality of inter-vane regions so that at least one of the part of the plurality of inter-vane regions being cut simultaneously is positioned away from a remainder of the part of the plurality of inter-vane regions being cut simultaneously by a distance of one or more inter-vane regions, and
   wherein, when the second cutting step is selected in the cutting step and the inter-vane regions, which has five or more, disposed continuously in the circumferential direction of the workpiece are divided into two groups and all of the inter-vane regions in each group are cut simultaneously, the inter-vane regions in said each group are positioned away from one another by a distance of one inter-vane region in the circumferential direction of the workpiece, and when there are an odd number of inter-vane regions, within the group having a greater number of inter-vane regions, two adjacent inter-vane regions are paired together for purposes of defining the inter-vane region.

2. The manufacturing method of a compressor impeller according to claim 1, wherein the plurality of vane sections includes two kinds of vanes which are long vanes, and short vanes having vane length shorter than that of the long vanes, and wherein, when the long vanes and the short vanes are formed alternately with intervals in the circumferential direction of the workpiece, each region delimited by adjacent two of the long vanes is regarded as one of the inter-vane regions.

3. The manufacturing method of a compressor impeller according to claim 1, wherein the plurality of vane sections includes two kinds of vanes which are long vanes, and short vanes having vane length shorter than that of the long vanes, and wherein, when the long vanes and the short vanes are formed alternately with intervals in the circumferential direction of the workpiece, each region delimited by one of the long vanes and one of the short vanes adjacent to each other is regarded as one of the inter-vane regions.

4. A compressor impeller manufactured by the manufacturing method according to claim 1.

5. The manufacturing method of a compressor impeller according to claim 1, wherein each of the inter-vane regions in the same group are not positioned opposite each other in the circumferential direction of the work piece.

* * * * *